(12) United States Patent
Saghbini

(10) Patent No.: US 7,020,500 B2
(45) Date of Patent: Mar. 28, 2006

(54) MOBILE COMMUNICATION SYSTEM POWERED BY MULTIPLE BATTERIES

(76) Inventor: Michael Gabriel Saghbini, 14175 Korrey Dr., San Diego, CA (US) 92129

( * ) Notice: Subject to any disclaimer, the term of this patent is extended or adjusted under 35 U.S.C. 154(b) by 175 days.

(21) Appl. No.: 10/707,462

(22) Filed: Dec. 16, 2003

(65) Prior Publication Data

US 2005/0130712 A1     Jun. 16, 2005

(51) Int. Cl.
*H04M 1/00*     (2006.01)
(52) U.S. Cl. .................. 455/571; 455/572; 455/573
(58) Field of Classification Search .............. 455/572, 455/573, 575.1, 550.1, 557, 571, 343.1, 343.6, 455/574
See application file for complete search history.

(56) References Cited

U.S. PATENT DOCUMENTS

| | | | |
|---|---|---|---|
| 5,771,471 A * | 6/1998 | Alberth et al. .............. 455/573 |
| 6,545,445 B1 * | 4/2003 | McDermott et al. ........ 320/103 |
| 2001/0021663 A1 * | 9/2001 | Sawada et al. ............. 455/572 |
| 2003/0013506 A1 * | 1/2003 | Wang ......................... 455/573 |
| 2003/0069050 A1 * | 4/2003 | Lin ............................. 455/572 |
| 2003/0073469 A1 * | 4/2003 | Wu ............................. 455/569 |
| 2003/0086718 A1 * | 5/2003 | Birumachi ................... 399/67 |
| 2003/0181226 A1 * | 9/2003 | Kawata et al. ............. 455/572 |
| 2003/0211869 A1 * | 11/2003 | Lee ........................... 455/572 |
| 2004/0023698 A1 * | 2/2004 | Chang ........................ 455/573 |

* cited by examiner

*Primary Examiner*—Sonny Trinh
(74) *Attorney, Agent, or Firm*—Michael G. Saghbini

(57) ABSTRACT

A mobile communication system powered by multiple batteries comprises a mobile telephone that can functionally connect via a power cable to a special supplemental battery or at least one existing battery functionally contained in a minimal housing. The special battery and the minimal housing have a compact body unconstrained by the mobile telephone compact body. They are optimized for comfortably to maximally fit, in a comfortable manner, in a pocket of the mobile telephone user to permit carrying the maximum power while still being portable in a hands-free manner using clothing including clothing accessories of the user. An adapter allows connection of either the supplemental battery or the minimal housing containing the at least one existing battery to mobile telephones of different makes and models. A charging adapter allows charging a rechargeable battery.

4 Claims, 5 Drawing Sheets

MOBILE COMMUNICATION SYSTEM POWERED BY MULTIPLE BATTERIES

BACKGROUND OF INVENTION

1. Field of the Invention

The present invention relates to a mobile telephone powered by multiple batteries to extend mobile operation time.

2. Description of Related Art

Mobile telephones have become very popular due to their mobile nature. They are characterized by a compact body that allows them to easily fit in a purse or a pocket, or comfortably clip onto a belt, a purse strap or an article of clothing of a user. Mobile telephones pack their own power source and operate wirelessly over a voice/data network permitting direct communication anywhere within the network coverage area. Power is provided in the form of a rechargeable main battery functionally connected via the battery connector to the mobile telephone forming part of its compact body. The main battery, which provides the appropriate voltage to operate all the mobile telephone features, has a size, shape and weight that are constrained by the compact size, shape and weight of the mobile telephone body. Main batteries come in different sizes, shapes, weights, voltage outputs and battery connectors to match the diverse makes and models of mobile telephones.

The industry trend in mobile telephones is toward reducing their compact body size and weight while packing more features, such as internet surfing and downloading capabilities, playing music and video games, taking and transmitting still images and video clips, etc. Smaller telephones translate into smaller main batteries yet more power is needed to support the diverse features added. Advances in rechargeable battery chemistry have reduced the main battery size while increasing its power capacity. Reducing and managing power consumption in mobile telephones have contributed to a longer battery life. Yet, despite these improvements mobile voice communication is still measured in few hours. Using the added features is likely to consume more power further reducing mobile operation time.

The need for additional portable power for mobile telephones has been recognized. Solutions presented thus far do not adequately increase the mobile operation time in a truly mobile and continuous fashion such that no down period is needed for connecting the additional power and power to the mobile telephone is not interrupted during the connection process. An adequate mobile operation time is at least two times greater than the mobile operation time provided by the main battery. Also, current solutions tend to be mobile telephone make and to some extent model specific rendering them obsolete upon replacing the mobile telephone.

Auxiliary batteries, as a current solution, might barely double the mobile operation time, however, at the expense of increasing the mobile telephone size and weight going against the industry trend. Spare main batteries are limited in power capacity. Both auxiliary and spare batteries are constrained by the mobile telephone size and shape and thus tend to be mobile telephone specific. Besides, power to the mobile telephone is interrupted upon connecting spare batteries and possibly auxiliary batteries. Rapid portable battery chargers, whether mechanical or solar, provide only a limited increase in mobile operation time while requiring a down period for recharging.

Existing "portable" power supplies and power generators can properly increase the mobile operation time when connected to the mobile telephone main battery charging connector. However this is accomplished at the expense of sacrificing mobility, the greatest advantage a mobile telephone offers. The bulky nature of these power storing devices and their weight prevent their hands-free portability using clothing including clothing accessories of a mobile telephone user, for example, these devices do not fit in a pocket or comfortably clip onto a belt, a purse strap or such. Besides, when a mobile telephone is powered via the main battery charging connector, a power status is not displayed for the power source powering the mobile telephone and the main battery is constantly charged, unless full, decreasing its life cycle and power capacity.

More importantly, the crowding of existing portable power supplies and generators with features designed to make them useful and attractive reduces the maximum power that can be packed as a function of size upon reduction of these power sources to an acceptable portable size and weight for powering a mobile telephone due to a smaller place for the built-in battery. Crowding features for existing portable power supplies include: at least one electrical AC outlet, a DC power socket, an AC inverter to convert AC power to DC power, a high power DC connector, a high current capacity connector, protection against output overload and heating, an alarm to alert when the built-in battery is nearly discharged and a battery level indicator. Portable generator, in addition, have to accommodate mechanical or solar charging gear.

A portable generator, the FreeCharge power source from Freeplay Energy Corporation, has been reduced in size for use with mobile telephones. It's main disadvantage, as indicated above, is a small power capacity as a function of its size in order to accommodate the mechanical charging gear. The maximum power capacity of the FreeCharge power source is limited to 1000 mAh. Yet, this device, with a length of 5.7" (144 mm), a height of 2" (52 mm), a width of 2.4" (60 mm) and a weight 8 oz (230 gram) is bigger and heavier than a standard mobile telephone comprising a battery carrying 1000 mAh. The bulky nature of the FreeCharge power source makes it unattractive for portability by a user considering its limited power capacity which requires frequent charging of the FreeCharge power source during extensive mobile operation of a mobile telephone, a process that can be exhaustive if done manually.

SUMMARY OF INVENTION

The present invention addresses shortcomings in the prior art noted above. It is the main objective of the present invention to provide a simple and effective solution to the power shortage problem in mobile telephones that is applicable to most makes and models. In particular, it is intended for the present invention to provide a mobile operation time for a mobile telephone at least two times greater than the mobile operation time provided by the main battery while preserving, or even enhancing, the main battery power without changing the size, shape and weight of the handheld portable part the mobile telephone body and without interrupting power to the mobile telephone during the connection process. The enhanced mobile operation time is achieved while providing a portability and usability for the mobile telephone with enhanced portable power similar to that of the mobile telephone alone.

The desired objectives are best accomplished by providing a mobile communication system comprising a mobile telephone, a special supplemental battery and a power cable. The mobile telephone comprises a main battery forming part of its compact body as the primary power source, and a power connector for connecting to the supplemental battery via the power cable. The power cable comprises a predetermined length to allow comfortable operation of the mobile telephone connected to the supplemental battery when the supplemental battery is associated with clothing including clothing accessories of the mobile telephone user.

The supplemental battery, which becomes the primary power source when connected to the mobile telephone, has a compact body unconstrained by the mobile telephone compact body. It comprises a closed, sturdy, compact outer housing having a predetermined size and shape optimized for comfortably fitting in the user's pocket, and a predetermined weight for comfortable portability by the user. These properties allow the supplemental battery a hands-free portability using clothing including clothing accessories of the user permitting its transportation in a pocket, a purse, a briefcase or attached to an article of clothing, a belt, a purse strap or such anywhere the mobile telephone is normally carried. The supplemental battery also comprises a predetermined power capacity, which is at least two times greater than the capacity of the mobile telephone main battery, maximized as to the size and shape of the outer housing.

An essential feature of the supplemental battery is comprising a battery connecting means for appropriately connecting to the power cable which in turn can be connected to the mobile telephone to produce a flexible and functional connection for powering the mobile telephone. Such a connecting means, which is absent form existing batteries, when combined with hands-free portability and use as a separate entity independent of the mobile telephone body render the supplemental battery a custom battery.

In a preferred embodiment, the predetermined size and shape for the supplemental battery are optimized to maximally fit, in a comfortable manner, in the user's pocket to minimize waste portable space and maximize portable power while preserving the hands-free portability.

In another preferred embodiment the supplemental battery is replaced with at least one existing battery adapted for powering the mobile telephone via a minimal housing that can appropriately connect to the power cable. The minimal housing is contoured to functionally fit the at least one battery minimizing wasted empty space and maximizing power capacity as a function of the size and shape of the minimal housing while still comfortably fitting in the user's pocket.

In a further preferred embodiment the minimal housing is optimized to maximally fit in the user's pocket to minimize wasted portable space and maximize portable power while preserving the hands-free portability.

In some embodiments, an adapter is utilized to connect either the supplemental battery or the at least one battery contained within the minimal housing to a plurality of mobile telephones of various makes and models having different power connectors.

In other embodiments, a mobile telephone used as part of the mobile communication system of the present invention is modified to display a power status for the supplemental battery or the at least one battery contained within the minimal housing, and/or to permit exclusive powering of the mobile telephone without charging the main battery unless prompted by the user.

The present invention provides an effective solution to the power shortage problem in mobile telephones that can be readily practiced using existing technologies. It permits, for the first time, extensive operation of a mobile telephone away from a fixed power source, in a truly mobile fashion, anywhere the mobile telephone is normally carried. This is extremely beneficial to users as they would now have sufficient power to liberally use all features of their mobile telephone. Carriers obviously benefit from an increased usage which could probably bring down cost resulting in more benefit to the user and more business to the carrier. The universality of current invention is also beneficial to mobile telephone manufacturers by prompting users to change their mobile telephones more often due to normal wear and tear associated with increased usage and to acquire newer models with more features without being locked into a particular manufacturer's make and model.

BRIEF DESCRIPTION OF DRAWINGS

The following detailed description of the present invention, given by way of example, will best be appreciated in conjunction with the appended drawings, in which like characters denote like parts and wherein.

DETAILED DESCRIPTION

Figure 1:
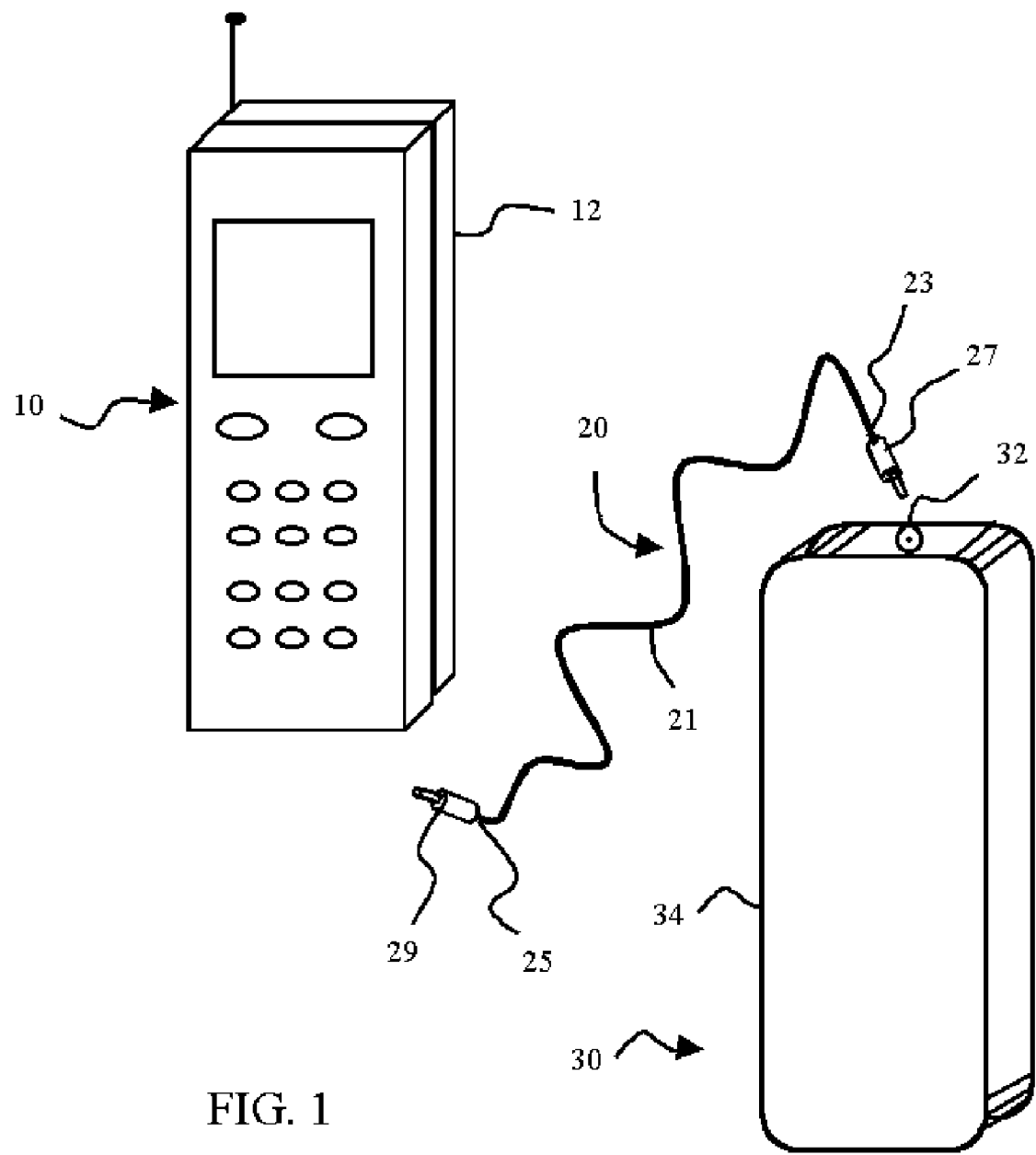
FIG. 1 is a perspective view of a first embodiment of the present invention showing a disconnected mobile telephone, a power cable and a custom supplemental battery.

The present invention provides a mobile communication system powered by multiple batteries permitting extensive mobile operation away from a fixed power source. FIG. 1 is a perspective view of a first embodiment of the present invention. This embodiment comprises: (1) a handheld mobile telephone indicated at 10 having a compact body comprising a main rechargeable battery 12 as the primary power source for powering the mobile telephone, and a power connector (not shown) for detachably connecting to an independent power source regardless of the connection of battery 12; (2) a power cable 20 for detachably connecting the independent power source to mobile telephone 10 power connector; and (3) a special supplemental battery 30, as the independent power source, having a compact body unconstrained by mobile telephone 10 compact body. Supplemental battery 30 becomes the primary power source upon connection to mobile telephone 10.

Power cable 20 comprises: (1) a flexible power cord 21 having a first end 23 and a second end 25; (2) a cable connecting means 27 for connecting first end 23 to the independent power source, which in FIG. 1 is supplemental battery 30; and (3) a cable connector 29 appropriately coupled to second end 25 for detachably mating with mobile telephone 10 power connector in a secure manner without falling off if the mobile telephone is handled without supporting the connection.

Cable connecting means 27 may be any suitable connector for functionally connecting end 23, in a detachable or non-detachable manner, to battery connecting means 32 of supplemental battery 30. Referring to FIG. 1, cable connecting means 27 is a cable connector appropriately coupled to first end 23 while battery connecting means 32 is the corresponding battery connector functionally disposed within battery 30 for mating with this cable connector in a secure and detachable manner without falling off if battery 30 is handled without supporting the connection. An example of a suitable cable connector representing cable connecting means 27 is the connector found in the AC/DC charging adapter provided by Kyocera, model: TXACA082. Cable connector 29 and the cable connector representing cable connecting means 27, which may be the same or different connectors, are characterized by a compact body that does not easily bend or deform during storage, transportation and repeated functional connections.

In embodiments where cable connecting means 27 of power cable 20 forms a non-detachable connection with supplemental battery 30, the point of connection with battery 30 is appropriately reinforced to provide a stable and robust connection minimizing damage that could result from repeated inappropriate handling of battery 30 coupled to power cable 20, for example, (1) bending of the cable at the point of contact with battery 30 during transportation, use and/or storage, and (2) manipulating the battery via the coupled power cable without supporting the battery. A preferred reinforced connection is found in the AC/DC charging adapter provided by Kyocera, model: TXACA082. Other reinforced connections can also be used.

Power cable 20, whether permanently or detachably connected to supplemental battery 30, has a predetermined length to allow comfortable operation of mobile telephone 10 connected to battery 30 via power cable 20 when battery 30 is associated with clothing including clothing accessories of the mobile telephone user, for example, when battery 30 is placed in a pocket, a purse, or a briefcase, or is attached to a purse strap, a belt, an article of clothing, or such. The predetermined length for power cable 20 is made possible by power cord 21. In some embodiments power cord 21 has a straight configuration while in other embodiments it is coiled like a telephone cord.

Supplemental battery 30 is a special portable battery comprising: (1) a closed, sturdy, compact outer housing 34 having a predetermined size and a predetermined shape optimized for comfortably fitting in a pocket of mobile telephone 10 user, the pocket being a standard shirt or pant pocket or its equivalent; (2) a predetermined power capacity, at least two times greater than the capacity of main battery 12 of mobile telephone 10, maximized as to the size and shape of outer housing 34 such that a maximum power capacity is provided in the smallest desired dimensions (size and shape) for the outer housing; (3) a predetermined weight for comfortable portability by the user; and (4) a battery connecting means 32 for appropriately connecting battery 30 to cable connecting means 27 of power cable 20 to provide an appropriate, flexible and functional connection between supplemental battery 30 and mobile telephone 10 when power cable 20 is also connected to mobile telephone 10. The functional connection permits powering of mobile telephone 10 by supplemental battery 30.

Comfortable fitting in a user's pocket coupled with the appropriate predetermined weight provide a hands-free portability for supplemental battery 30 using clothing including clothing accessories of the mobile telephone user similar to the hands-free portability of mobile telephone 10. An appropriately configured battery 30 easily fits in a pocket, a purse, a brief case, a carrying pouch, etc, and comfortably attaches, if properly equipped with a clip, to an article of clothing, a belt, a purse strap or such permitting transportation of battery 30 anywhere mobile telephone 10 is normally carried.

A predetermined size for outer housing 34 permitting the hands-free portability of battery 30, comprises: (1) a maximum length up to 6 inches, preferably up to 5 inches and optimally up to 4 inches; (2) a maximum width up to 4 inches and preferably up to 3 inches; and (3) a maximum depth up to 1.5 inches and preferably up to 1 inch. A predetermined weight for hands-free portability of battery 30 comprises up to 500 grams, preferably up to 400 grams, more preferably up to 300 grams and optimally up to 200 grams. A preferred predetermined shape for outer housing 34 comprises a rectangular box with curved edges for ease of retrieval from the user's pocket, however, the edges can also be sharp. Outer housing 34 can have a cylindrical, or a cylindroid shape where the elliptical element perpendicular to the battery long axis has various degrees of ellipticity. Outer housing 34 can have any regular or irregular shape as long as it satisfies the above described properties for battery 30.

In a preferred embodiment, the predetermined size and shape for outer housing 34 are optimized for maximally fitting, in a comfortable manner, in the user's pocket to minimize wasted portable space and to maximize portable power while preserving the hands-free portability of battery 30. This maximum portable power is referred to as maximum hands-free portable power. In embodiments where battery 30 is coupled to power cable 20, maximum comfortable fitting in the user's pocket takes into consideration the attached power cable.

Battery connecting means 32 of supplemental battery 30 include connectors that can make a functional and secure connection, in a detachable or non-detachable manner, with an appropriate end 23 of power cord 21 to transmit appropriate power and sensing signals to mobile telephone 10. Existing battery connectors are not suitable for use in supplemental battery 30, for example, conductive contacts designed for contact connection, or mating connectors designed for being enclosed within a compartment where the battery is not handled by itself without supporting the connection and where the mating connector, if separated form the battery body by a short cable, the cable is not reinforced at the point of connection with either the battery or the mating connector. An example of a suitable detachable battery connector representing second connecting means 32 is the charging connector used in the QCP 2035a mobile telephone by Kyocera. Other charging connectors present in mobile telephones of various makes and models can also be used.

Supplemental battery 30 may be a primary battery, however, it is preferably a rechargeable battery. If rechargeable, battery 30 is preferably a rechargeable Lithium-Ion battery and more preferably a rechargeable Lithium-Ion Polymer battery. Both battery types are characterized by a light weight and a high charge capacity without a memory effect. Battery 30 can also be a Nickel Metal Hydride (NiMH), Nickel Cadmium (NiCd) or other rechargeable battery types.

Supplemental battery 30 may include one or multiple battery cells appropriately connected to produce the desired power capacity and the proper voltage needed to power mobile telephone 10. Being maximized for power capacity as a function of its outer housing dimensions, battery 30 preferably comprises only elements needed for its safe manufacturing, proper use, and proper storage with no or minimal power discharge as per industry standard. Battery 30 may also contain elements that can improve utility and portability, for example, a power level indicator to indicate the power status of battery 30 independent of its connection to the mobile telephone, a clip to attach to an article of clothing, and/or partial or complete charging components if rechargeable. All elements and features of battery 30 are well known in the art of batteries. A preferred predetermined power capacity for battery 30 comprises at least 2000 mAh. A more preferred capacity comprises at least 3000 mAh. A further preferred capacity comprises at least 4000 mAh. A further more preferred capacity comprises at least 5000 mAh. A most preferred capacity comprises at least 6000 mAh.

Supplemental battery 30 is a custom battery by virtue of its use as a separate entity independent of mobile telephone 10, its compact body which is not constrained by mobile telephone 10 compact body, its hands-free portability that can be optimized for maximum hands-free portable power, and its battery connecting means 32 for appropriately connecting to power cable 20. It is desirable, in the present invention, to use existing batteries that are readily-available. However, such batteries, unmodified, are not able to appropriately connect via their battery connectors to cable connecting means 27 of power cable 20 to complete the appropriate functional connection to mobile telephone 10. Furthermore, existing batteries are not designed to carry the maximum hands-free portable power easily attained by a preferred custom supplemental battery 30.

In another preferred embodiment, supplemental battery 30 is replaced with at least one existing battery adapted for powering mobile telephone 10 via a minimal housing that provides the appropriate connection to cable connecting means 27 of power cable 20. The appropriate connection being provided by a power connecting means identical to battery connecting means 32 of battery 30. The power connecting means provides an appropriate, flexible and functional connection between the minimal housing containing the at least one battery and mobile telephone 10 when power cable 20 is also connected to the mobile telephone. This functional connection permits powering of mobile telephone 10 by the minimal housing containing the at least one battery. The at least one battery replacing supplemental battery 30 comprises a power capacity preference identical to battery 30. It preferably comprises a rechargeable Lithium-Ion battery and more preferably a rechargeable Lithium-Ion Polymer battery. Other battery types can also be used The minimal housing containing the at least one battery has a compact body that is not constrained by mobile telephone 10 compact body. It comprises a predetermined size and shape for comfortably fitting in a pocket of the mobile telephone user, and a predetermined weight when containing the at least one battery for comfortable portability by the user. The predetermined size, shape and weight have properties identical to that of supplemental battery 30. An essential feature of the minimal housing is comprising a predetermined shape contoured to functionally fit the at least one battery minimizing wasted empty space and maximizing power capacity as a function of the predetermined size and shape of the minimal housing to produce a minimal, compact, portable power supply having an identical hands-free portability as supplemental battery 30 and similar to mobile telephone 10.

In a further preferred embodiment, the predetermined size and shape of the minimal housing are optimized to maximally fit, in a comfortable manner, in a user's pocket to minimize wasted portable space and maximize portable power while preserving hands-free portability. This further preferred embodiment requires the use of at least one existing battery and/or at least one custom battery having any one of the existing battery connectors. In another further preferred embodiment the minimal housing predetermined size, as defined by a maximum length, width and depth, is less than mobile telephone 10 body size, and its predetermined weight when containing the at least one battery is less than mobile telephone 10 weight to provide a portability similar to that of mobile telephone 10.

A battery particularly suited for use in a minimal housing is manufactured by Panasonic as the prismatic single cell Lithium-Ion (rechargeable), model number MP176065. It carries 6000 mAh and has an appropriate weight and dimensions for hands-free portability (depth/diameter: 18 mm; length/height: 59.8 mm; width/thickness: 65 mm. Weight: 150 grams). The prismatic single cell battery when directly connected to a mobile telephone produces a bulky undesirable mobile telephone according to the industry miniaturization trend. However, when fitted in a compact minimal housing according to the present invention, the prismatic single cell can connect to a very compact mobile telephone, maybe similar in size to the battery itself, to provide a mobile power at least two times greater than that provided by the mobile telephone main battery, even if the main battery is of the same type as the prismatic cell, due to a larger size for the prismatic cell.

Figure 2:
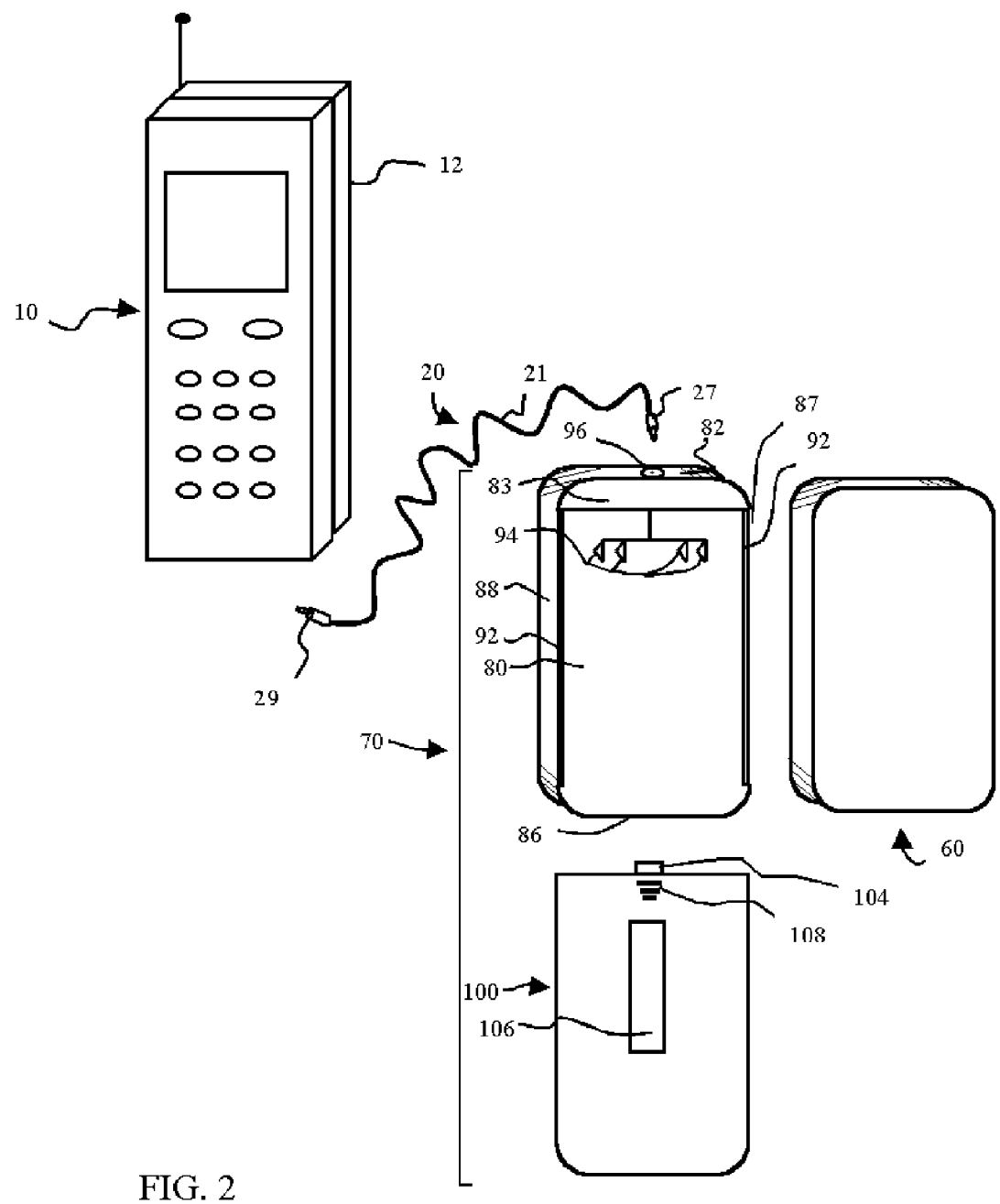
FIG. 2 is a perspective view of a preferred embodiment of the present invention showing an existing battery and its appropriate minimal housing including the cover.

FIG. 2 is a perspective view of a preferred embodiment of the mobile communication system of the present invention where supplemental battery 30 is replaced with an at least one existing battery indicated at 60 and its corresponding minimal housing indicated at 70. Minimal housing 70 comprises a chamber 80 defined by a top side 82 parallel to a bottom side 86, both connected to a right side 87 and a left side 88, with all four sides 82, 86, 87 and 88 connected to a bottom side (not shown). The right and left sides 87 and 88 comprise a rail element 92 spanning the length of these sides and located near the top edge farthest away from the bottom side to assists in locking cover 100 over compartment 80. A front side 83 connected to top side 82, right side 87 and left side 88, opposite the back side, contains a locking mechanism (not shown) to assist in detachably connecting cover 100 to housing 70 to form a continuous front side with side 83. Chamber 80 is designed to snuggly and functionally fit battery 60 while minimizing wasted empty space. Disposed within the interior cavity of chamber 80 is an appropriate electrical connection 94 for functionally connecting to the battery connector of battery 60 (not shown). The electrical connection 94 is coupled to a power connecting means 96 disposed within housing 70 for connecting with cable connecting means 27 of power cable 20 in an appropriate and functional manner to permit powering mobile telephone 10. Power connecting means 96 is identical to battery connecting means 32 of supplemental battery 30 and comprises the same limitations and properties as battery connecting means 32.

Figure 3:
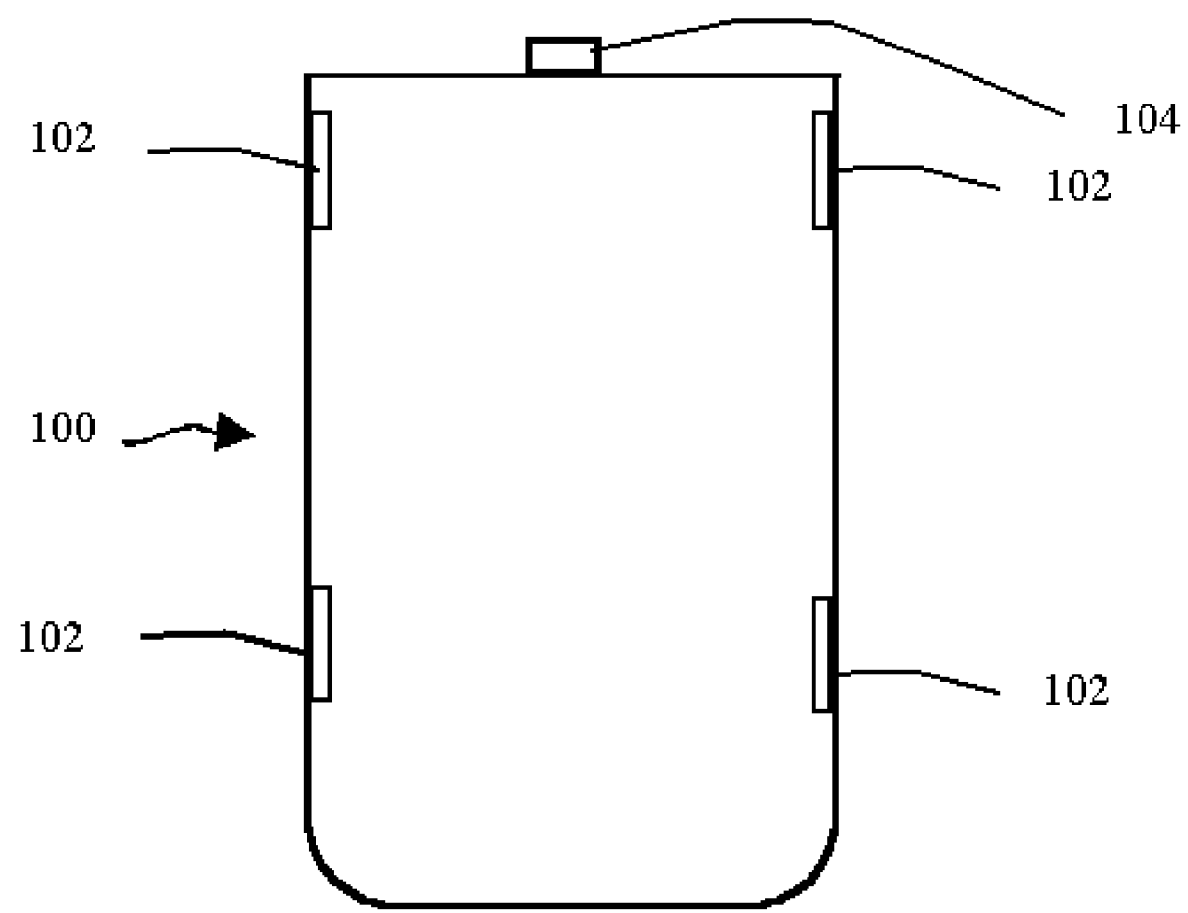
FIG. 3 is an inside view of the cover shown in FIG. 2.

Cover 100 which securely holds battery 60 within compartment 80, comprises: (1) a plurality of rail engaging elements 102, protruding from the inner right and left sides as shown in FIG. 3, for engaging rail element 92 while closing compartment 80; (2) a properly disposed locking mechanism 104 to engage the appropriate locking mechanism disposed within side 83 of housing 70; and (3) a grip 108 to assist in detaching cover 100 form housing 70. A variety of designs are available for cover 100 that can be used to securely close compartment 80.

In the illustrated embodiment of FIG. 2 a clip 106 is provided for detachably attaching this minimal power supply to an article of clothing including clothing accessories of a user such as a belt, a purse strap, or such. Clip 106 is appropriately disposed on the surface of minimal housing 70 to permit housing 70 containing battery 60 to more readily hang when attached as described above. As shown, clip 106 is mounted on the upper part of the outer side of cover 100 below grip 108. The sturdy design of locking mechanism 104 prevents the detaching of cover 100 when clip 106 is repeatedly moved in and out of attachment. Various clip designs exist that can be used in the current invention. Preference is given to a slim design that occupies a minimal amount of space. In alternative embodiments clip 106 is omitted.

Figure 4:
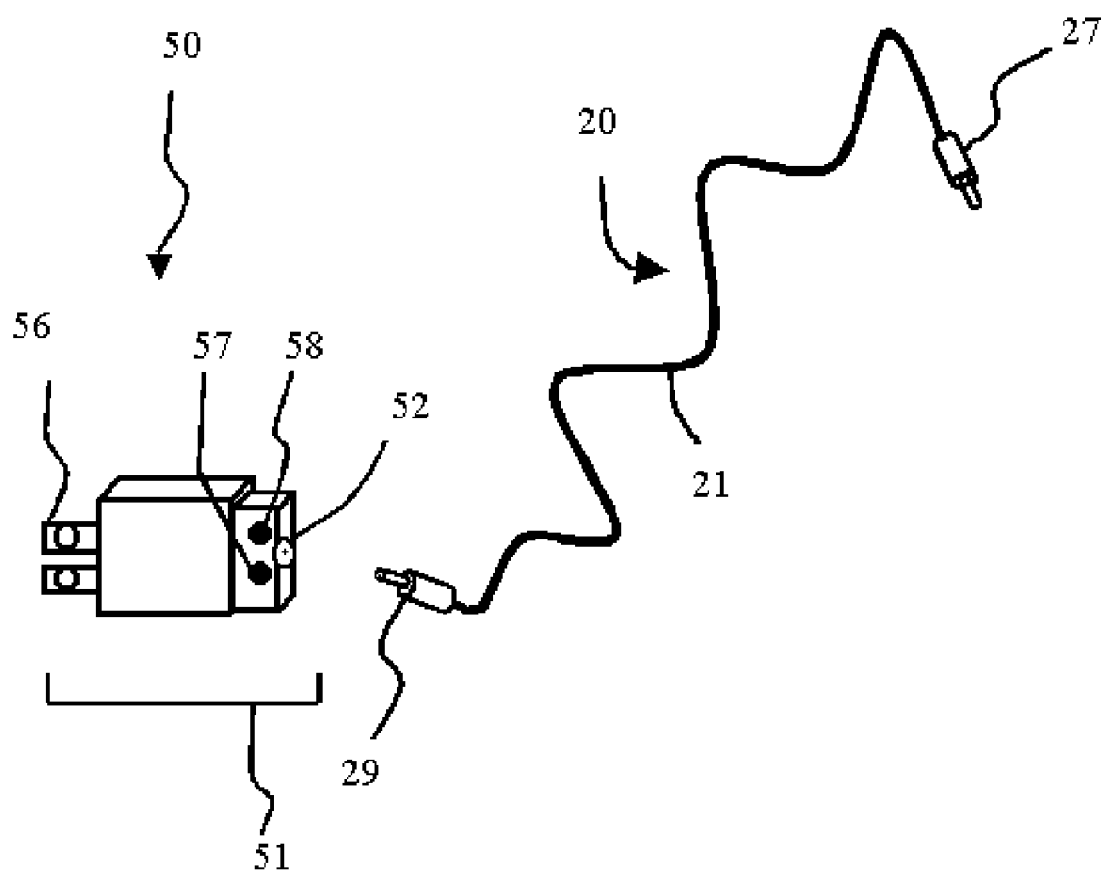
FIG. 4 is a perspective view of an AC/DC charging adapter showing the power cable of FIG. 1.

If either supplemental battery 30 or the at least one battery contained within minimal housing 70 are rechargeable then appropriate charging elements, depending on the battery type, are best functionally disposed within a separate charging adapter to allow for a maximum functional power capacity in the smallest possible desired dimensions. FIG. 4 shows a preferred charging adapter 50 comprising: (1) a compact housing 51; (2) a connector 52 disposed within housing 51 for detachably mating with cable connector 29 of power cable 20 in a secure manner without falling off if the charging adapter is handled without supporting the connection; (3) an appropriate charging circuitry (not shown), depending on battery type, disposed within housing 51 and functionally coupled to connector 52; (4) an AC/DC adapter circuitry and components (not shown) properly disposed within housing 51 and functionally connected to the charging circuitry; (5) a set of polarized metal blades 56 protruding form housing 51 and functionally coupled to the AC/DC adapter circuitry and components for fitting in an electrical socket (not shown); and (6) LED 57 and 58 functionally coupled to the charging circuitry and visible form the surface of housing 51 to indicated connection to a charging source and completion of the charging process respectively. In some embodiments a single LED is used to indicate both functions. In further embodiments the set of metal blades and AC/DC adapter circuitry and components are replaced with circuitry and components for a car cigarette lighter adapter. Charging adapter 50 is manufactured using existing technologies to be as compact as possible.

To charge a rechargeable power source of the present invention according to the illustrated embodiment of FIG. 4, charging adapter 50 is connected to cable connector 29 of power cable 20 which in turns is connected to either battery 30 or the minimal power supply. Functional connection of charging adapter 50 to an electrical socket is indicated by LED 57. The appropriate charging voltage/current is carried thorough the charging circuitry and power cable 20 to charge the rechargeable power source. When charging is complete, signals sent via power cable 20 block the flow of charging voltage/current through the power cable without removing adapter 50 form the charging power source. LED 58 signals that charging is complete.

Figure 5:
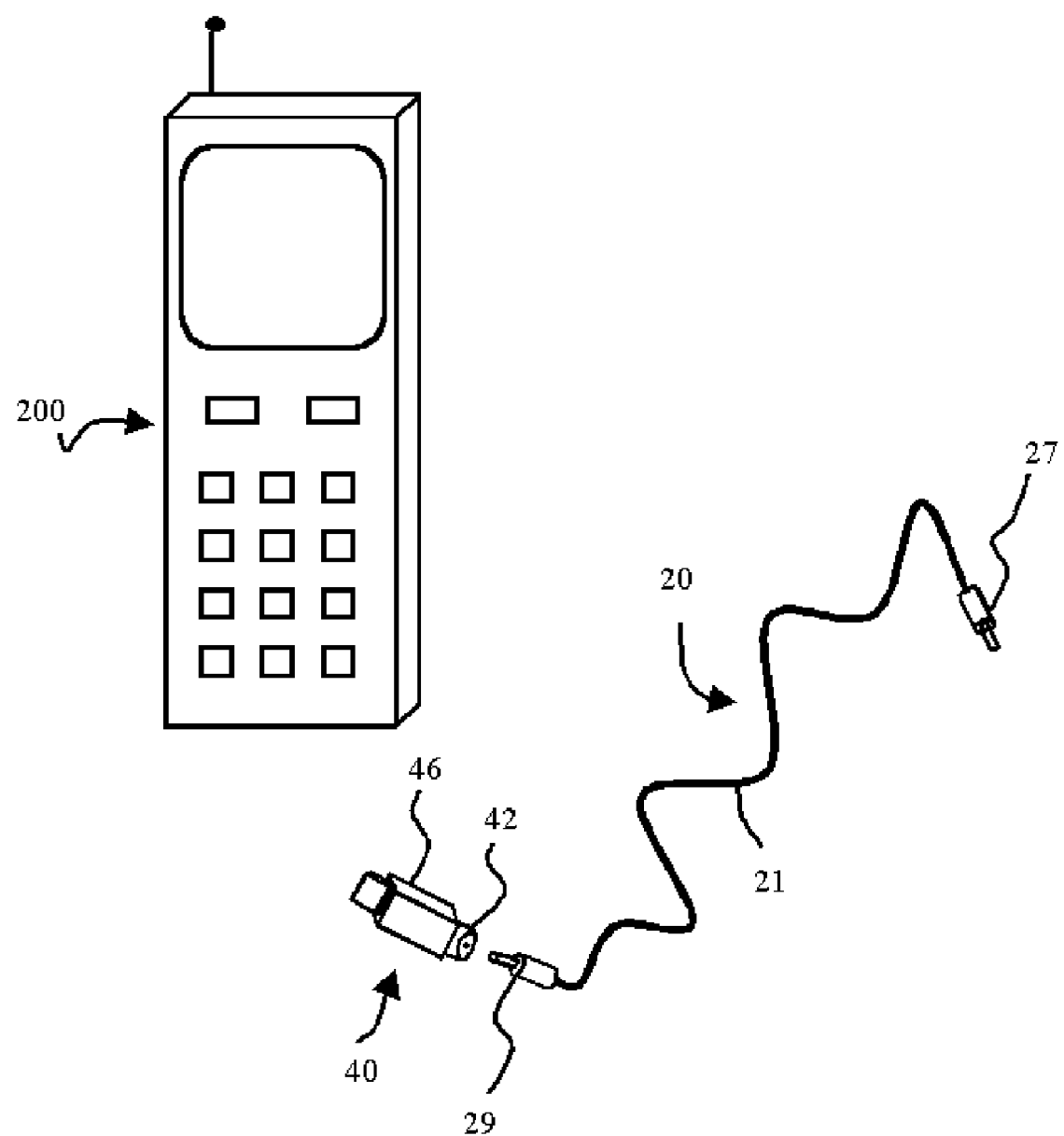
FIG. 5 is a partial perspective view of another embodiment of the present invention showing an adapter for connecting to a different mobile telephone than the one shown in FIG. 1.

Mobile telephone 10 shown in of FIGS. 1 and 2 is a handheld apparatus that packs its own power source and provides wireless voice communication regardless of any other features it possesses such as computing abilities, internet surfing and downloading capabilities, playing music and video games, taking and transmitting still images and video clips, or such. Mobile telephone 10 is easily portable using clothing including clothing accessories of the user. In a preferred embodiment, mobile telephone 10 comprises many of the features mentioned above along with a power connector that can appropriately mate with cable connector 29 of power cable 20 to permit powering the mobile telephone by supplemental battery 30 or the minimal power supply. Mobile telephones having power connectors that are not able to directly mate with cable connector 29, but can appropriately mate with different equivalent connectors, can be used as part of the mobile communication system of the present invention by utilizing a proper adapter. FIG. 5 illustrates an embodiment of the present invention using a different mobile telephone indicated at 200 comprising a different power connector than that of mobile telephone 10 (not shown). The use of adapter 40 completes the functional connection between power cable 20 and mobile telephone 200.

As shown in FIG. 5, adapter 40 comprises a first adapter connector 42 for mating with cable connector 29 functionally coupled to a second adapter connector 46 chosen from a plurality of connectors that respectively mate with one of a plurality of different power connectors present in mobile telephones of various makes and models. Connections made by adapter connectors 42 and 46 occur in a secure and detachable manner without falling off if the mobile telephone is handled without supporting the connections. A different adapter 40 is needed for each mobile telephone carrying a different power connector that does not directly mate with cable connector 29. In some embodiments, an adapter 40 is not used, instead power cable 20 is modified by replacing cable connector 29 with the appropriate cable connector designed to directly mate with the corresponding mobile telephone power connector.

In a preferred embodiment, the power connector of a mobile telephone used as part of the mobile communication system of the present invention, comprises a charging connector for charging the main rechargeable battery. In other embodiments, the power connector comprises a dedicated connector separate form the charging connector. In further embodiments, the power connector comprises a connector having a plurality of functions, for example, charging the main battery, communicating with supplemental devices, or such Current mobile telephones are not designed for efficient powering by supplemental battery 30, the minimal power supply, or any portable power source via the power connector since the main purpose of a mobile telephone is doing away with the power cord connection. Besides, powering via the power connector is only motivated by the desire to keep the mobile telephone functional while recharging the main battery which is supposed to be the primary power provider for the mobile telephone. In some embodiments, the power circuitry disposed within the compact body of a mobile telephone is modified, using existing technologies, to allow a power source to exclusively power all, or selected features, of the mobile telephone without charging the main battery, unless prompted by the user, thus prolonging the main battery life cycle and capacity by preventing its unnecessary charging. In other embodiments, the power display means disposed within the mobile telephone compact body is modified, using existing technologies, to display a power status for the power source in addition to displaying a power status for the main rechargeable battery. In alternate embodiments both modification discussed above are simultaneously present.

A mobile telephone used as part of the mobile communication system of the present invention is fully functional on its own without an added power source. However, connection of supplemental battery 30 or the minimal power supply, via power cable 20, with or without adapter 40, at least doubles, preferably triples or more, operation time, in a mobile fashion, compared to the mobile operation time provided by the main battery while preserving, or even enhancing, the main battery power.

An essential feature of the mobile communication system of the present invention is comprising a mobility advantage designed to ensure a portability and a usability for the mobile communication system similar to that of the mobile telephone itself which is part of this system while supplying power to the mobile telephone far in excess of that provided by its main battery. The mobility advantage comprises: (1) a predetermined length for power cable 20 to allow comfortable operation of the mobile telephone connected to supplemental battery 30 or the minimal power supply, via power cable 20, when battery 30 is associated with clothing including clothing accessories of the mobile telephone user; (2) a hands-free portability for the mobile telephone, supplemental battery 30 or the minimal power supply and if appropriate power cable 20, as separate units, using clothing including clothing accessories of the user; and (3) a no change in the size and shape of the handheld portable part of the mobile telephone body when powered by supplemental battery 30 or the minimal power supply via power cable 20.

While the present invention has been shown and described in conjunction with the illustrated embodiments thereof, various changes and modifications may be made to the disclosed embodiments all within the scope of the invention and such changes and modifications are intended to be included within the principals of the invention to the full extent indicated by the broad general meaning of the terms in which the appended claims are expressed.

The invention claimed is:

1. A mobile communication system powered by multiple batteries, comprising:
   a handheld mobile telephone having a compact body, comprising a main battery as a primary power source for powering said mobile telephone, and a power connector for detachably connecting to an independent power source regardless of a connection of said main battery, wherein said main battery forms part of said mobile telephone compact body and is constrained by said compact body, wherein said mobile telephone is functional without said independent power source, and wherein
   said power connector comprises a dedicated connector separate from of a charging connector used for charging said main battery.

2. A mobile communication system powered by multiple batteries, comprising:
   a handheld mobile telephone having a compact body, comprising a main battery as a primary power source for powering said mobile telephone, and a power connector for detachably connecting to an independent power source regardless of a connection of said main battery, wherein said main battery forms part of said mobile telephone compact body and is constrained by said compact body, wherein said mobile telephone is functional without said independent power source, and wherein a power circuitry disposed within said mobile telephone compact body is modified to allow said independent power source to exclusively power said mobile telephone without charging said main battery, unless prompted by a user, thus prolonging life cycle and capacity for said main battery by preventing its unnecessary charging.

3. A mobile communication system powered by multiple batteries, comprising:
   (a) a handheld mobile telephone having a compact body comprising a main battery as a primary power source for powering said mobile telephone, and a power connector for detachably connecting to an independent power source regardless of a connection of said main battery, wherein said main battery forms part of said mobile telephone compact body and is constrained by said compact body, wherein said mobile telephone is functional without said independent power source, and Wherein a power circuitry disposed within said mobile telephone compact body is modified to allow said independent power source to exclusively power said mobile telephone without charging said main battery, unless prompted by a user, thus prolonging life cycle and capacity for said main battery by preventing its unnecessary charging;
   (b) a power cable comprising a flexible power cord having a first end and a second end, a cable connecting means for connecting said first end to said independent power source, and a cable connector coupled to said second end for mating with said power connector in a secure and a detachable manner without falling off if said mobile telephone is handled; and
   (c) a supplemental battery, as said independent power source, having a compact body unconstrained by said mobile telephone compact body.

4. A minimal power supply for powering a mobile telephone, comprising:
   (a) a supplemental battery having a compact body unconstrained by said mobile telephone; and
   (b) a power cable comprising a flexible power cord having a first end and a second end, a cable connecting means for connecting said first end to said minimal power supply, and a cable connector coupled to said second end for mating with a power connector of said mobile telephone in a secure and a detachable manner without falling off if said mobile telephone is handled;
   Wherein a power circuitry disposed within said mobile telephone is modified to allow said independent power supply to exclusively power said mobile telephone without charging a main battery of said mobile telephone, unless prompted by a user, thus prolonging life cycle and capacity for said main battery by preventing its unnecessary charging.

* * * * *